(12) United States Patent
Lee et al.

(10) Patent No.: US 8,737,613 B2
(45) Date of Patent: May 27, 2014

(54) SCANNING METHODS OF TRANSFORM-BASED DIGITAL DATA PROCESSING THAT CONDITIONALLY ADJUST SCAN ORDER ACCORDING TO CHARACTERISTICS INFORMATION AND RELATED APPARATUS THEREOF

(75) Inventors: Kun-Bin Lee, Taipei (TW); Shaw-Min Lei, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1210 days.

(21) Appl. No.: 12/274,361

(22) Filed: Nov. 20, 2008

(65) Prior Publication Data

US 2010/0124284 A1    May 20, 2010

(51) Int. Cl.
*H04N 7/167* (2011.01)

(52) U.S. Cl.
USPC .............. 380/217; 375/240.18; 375/240.23; 375/240.24; 375/240.26

(58) Field of Classification Search
CPC .............. H04N 7/167; H04N 7/26095; H04N 7/26436; H04N 7/26553; H04N 7/26558; H04N 7/3066; H04N 19/00109; H04N 7/508; H04N 7/26244
USPC ........... 380/217; 375/240.18, 240.23, 240.24, 375/240.26
See application file for complete search history.

(56) References Cited

U.S. PATENT DOCUMENTS

| | | | |
|---|---|---|---|
| 5,767,909 A * | 6/1998 | Jung | 375/240.18 |
| 7,092,445 B2 | 8/2006 | Haskell | |
| 7,215,707 B2 | 5/2007 | Lee | |
| 2005/0078754 A1* | 4/2005 | Liang et al. | 375/240.18 |
| 2006/0146936 A1 | 7/2006 | Srinivasan | |

FOREIGN PATENT DOCUMENTS

| | | |
|---|---|---|
| CN | 1431828 A | 7/2003 |
| CN | 1798341 A | 7/2006 |

* cited by examiner

*Primary Examiner* — Eleni Shiferaw
*Assistant Examiner* — Paul Callahan
(74) *Attorney, Agent, or Firm* — Winston Hsu; Scott Margo (57) ABSTRACT

One scanning method of transform-based digital data processing includes: when processing data blocks, recording characteristics information for different block categories individually; conditionally adjusting scan orders of data processing of the block categories according to the characteristics information; and performing the data processing upon a current data block according to a scan order corresponding to a block category to which the current data block belongs. Another scanning method of transform-based digital data processing includes: recording characteristics information when processing data blocks; conditionally adjusting a scan order according to the characteristics information; keeping at least one position in the scan order fixed regardless of changes made to the scan order; and performing a data processing upon a current data block according to the scan order.

20 Claims, 11 Drawing Sheets

Scan order A1

Adjust

Scan order A2

(B)

Position index (A)

| Scan order | 0 | 4 | 1 | 2 | 5 | 8 | 12 | 9 | 6 | 3 | 7 | 10 | 13 | 14 | 11 | 15 |
|---|---|---|---|---|---|---|---|---|---|---|---|---|---|---|---|---|
| Candidate scan order | 0 | 4 | 1 | 2 | 5 | 8 | 12 | 9 | 6 | 3 | 7 | 10 | 13 | 14 | 11 | 15 |
| NZ_Count[i] | 10 | 9 | 7 | 7 | 7 | 6 | 4 | 1 | 0 | 0 | 0 | 0 | 0 | 0 | 0 | 0 |

↓ One block processed

| Candidate scan order | 0 | 4 | 1 | 2 | 5 | 8 | 12 | 9 | 6 | 3 | 7 | 10 | 13 | 14 | 11 | 15 |
|---|---|---|---|---|---|---|---|---|---|---|---|---|---|---|---|---|
| NZ_Count[i] | 11 | 10 | 7 | 7 | 8 | 7 | 4 | 1 | 0 | 0 | 0 | 0 | 0 | 0 | 0 | 0 |
| NZ_Map[i] | 1 | 1 | 0 | 0 | 1 | 1 | 0 | 0 | 0 | 0 | 0 | 0 | 0 | 0 | 0 | 0 |

↓ After rearrangement

| Candidate scan order | 0 | 4 | 1 | 5 | 2 | 8 | 12 | 9 | 6 | 3 | 7 | 10 | 13 | 14 | 11 | 15 |
|---|---|---|---|---|---|---|---|---|---|---|---|---|---|---|---|---|
| NZ_Count[i] | 11 | 10 | 8 | 7 | 7 | 7 | 4 | 1 | 0 | 0 | 0 | 0 | 0 | 0 | 0 | 0 |
| NZ_Map[i] | 1 | 1 | 1 | 0 | 0 | 1 | 0 | 0 | 0 | 0 | 0 | 0 | 0 | 0 | 0 | 0 |

SCANNING METHODS OF TRANSFORM-BASED DIGITAL DATA PROCESSING THAT CONDITIONALLY ADJUST SCAN ORDER ACCORDING TO CHARACTERISTICS INFORMATION AND RELATED APPARATUS THEREOF

BACKGROUND

The present invention relates to processing digital data such as video data or image data, and more particularly, to scanning methods of transform-based digital data processing that refer to characteristics information to conditionally adjust the scan order used for encoding/decoding data blocks and related apparatus thereof.

Figure 1:
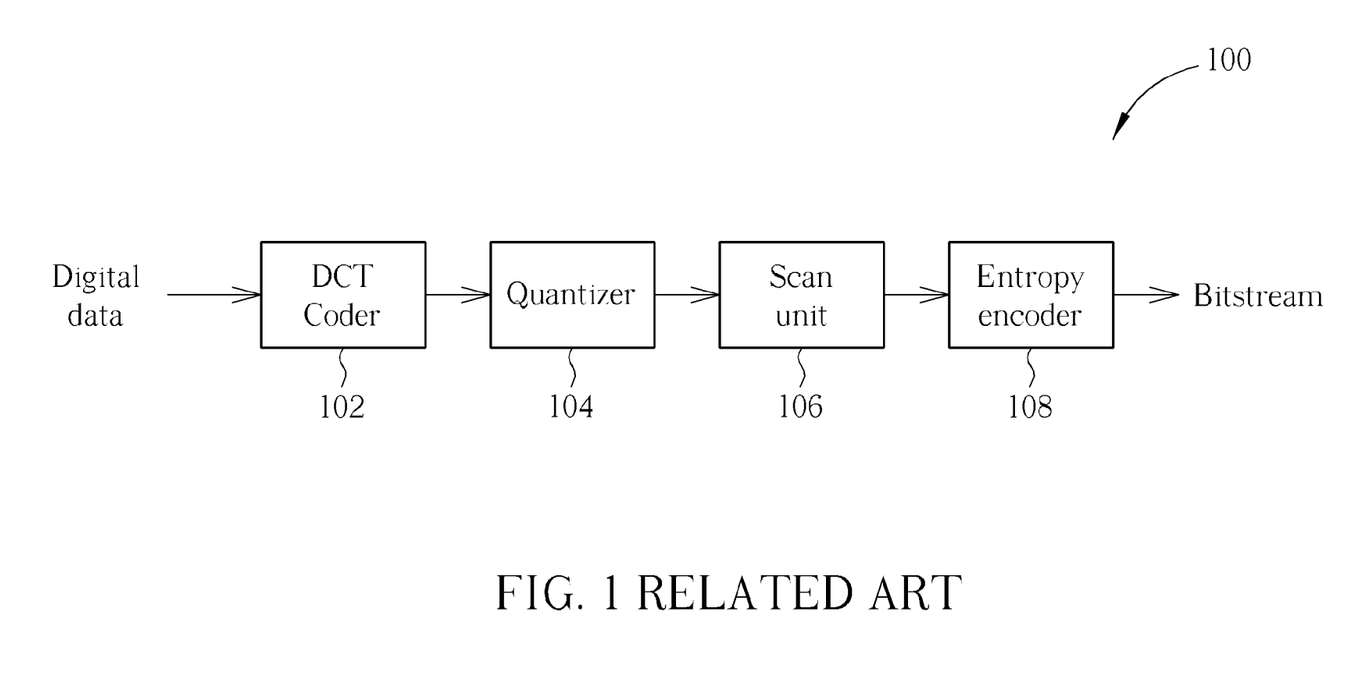
FIG. 1 is a simplified block diagram illustrating an encoder according to the related art.
Figure 2:
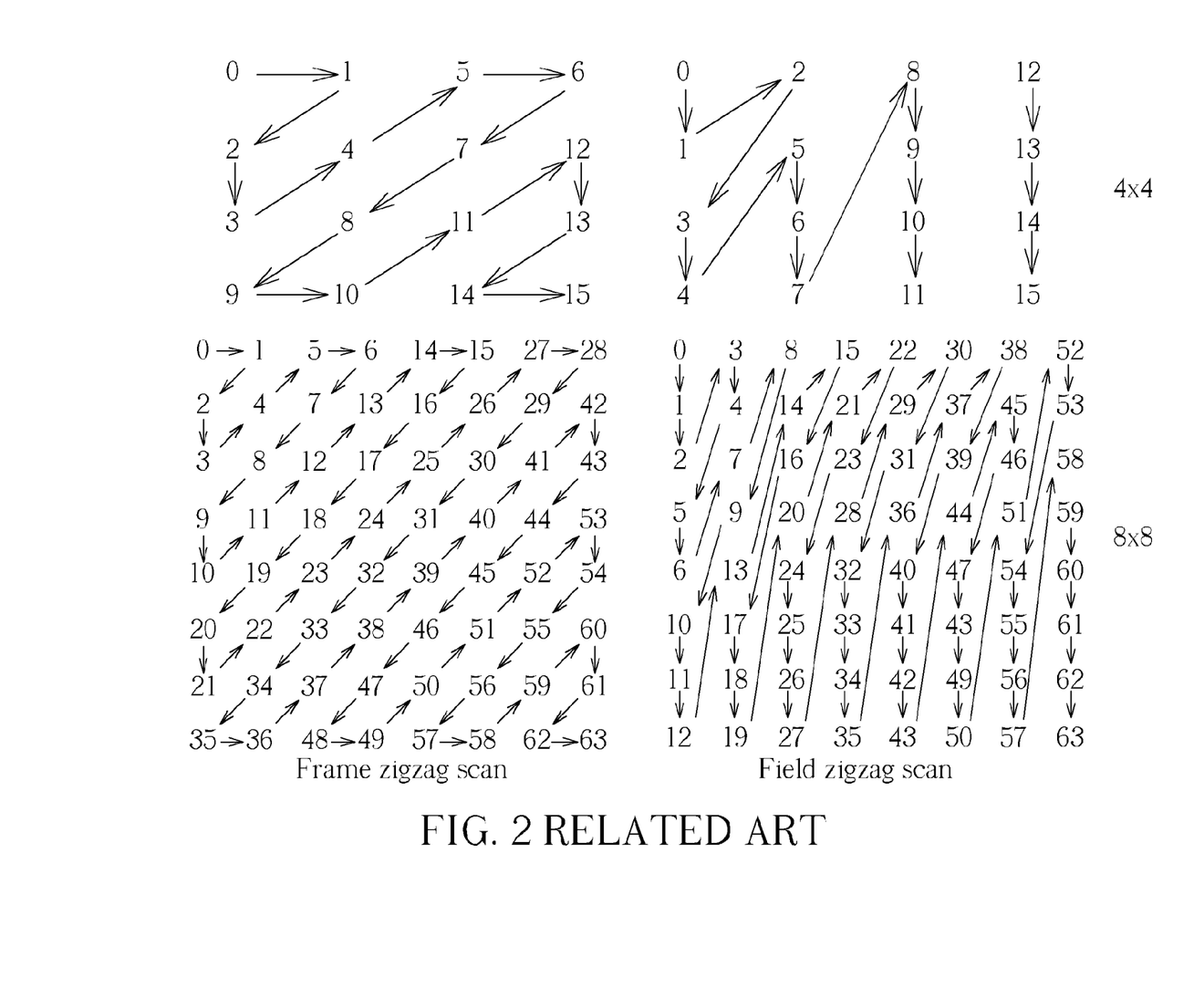
FIG. 2 is a diagram illustrating certain exemplary conventional zigzag scan orders.

Transform-based digital data processing is generally employed in an encoder to compress/encode video data/image data to be transmitted, and also employed in a decoder to decompress/decode the compressed/encoded data generated from the encoder. Taking MPEG-4 or H.264 standard for example, a discrete cosine transform (DCT) is involved in encoding data to be transmitted, and an inverse discrete cosine transform (IDCT) is involved in decoding encoded data. FIG. 1 is a simplified block diagram illustrating an encoder according to the related art. The conventional encoder 100 includes a DCT coder 102, a quantizer 104, a scan unit 106, and an entropy encoder 108. The DCT coder 102 receives digital data (e.g., video data or image data), and then transforms the digital data in a spatial domain into transform coefficients in a frequency domain. The quantizer 104 then quantizes the transform coefficients (i.e., DCT coefficients) to generate quantized transform coefficients. In general, the encoder 100 processes the digital data block by block. Therefore, the scan unit 106 is implemented to use a predetermined scan order to convert the two-dimensional data obtained through the preceding circuit into one-dimensional data passed to the following circuit for further processing, such as entropy encoding and/or quantization in encoding process, or entropy decoding and/or inverse-quantization in decoding process. A well-known zigzag scan order is commonly used for scanning the quantized transform coefficients (i.e., quantized DCT coefficients) at different positions in each data block. Please refer to FIG. 2, which illustrates certain exemplary conventional zigzag scan orders for a frame coded block with a block size of 4×4, a frame coded block with a block size of 8×8, a field coded block with a block size of 4×4, and a field coded block with a blocksize of 8×8, respectively.

After receiving the scan output from the scan unit 106, the entropy encoder 108 generates a bitstream through a run-level encoding scheme and variable-length coding. The run-level encoding is to encode each non-zero coefficient as a (run, level) pair, where "run" represents the number of zeros between a previous non-zero coefficient and a current non-zero coefficient, and "level" represents the value of the current non-zero coefficient. For example, assuming that a data sequence includes following values: 0, 3, 0, 1, −1, −1, 0, 1, 0, 0, 0, 0, 0, 0, 0, the (run, level) pairs of the exemplary data sequence are (1,3), (1,1), (0,−1), (0,−1), and (1,1). Each of the derived (run, level) pairs is then encoded using a variable-length code.

Figure 3:
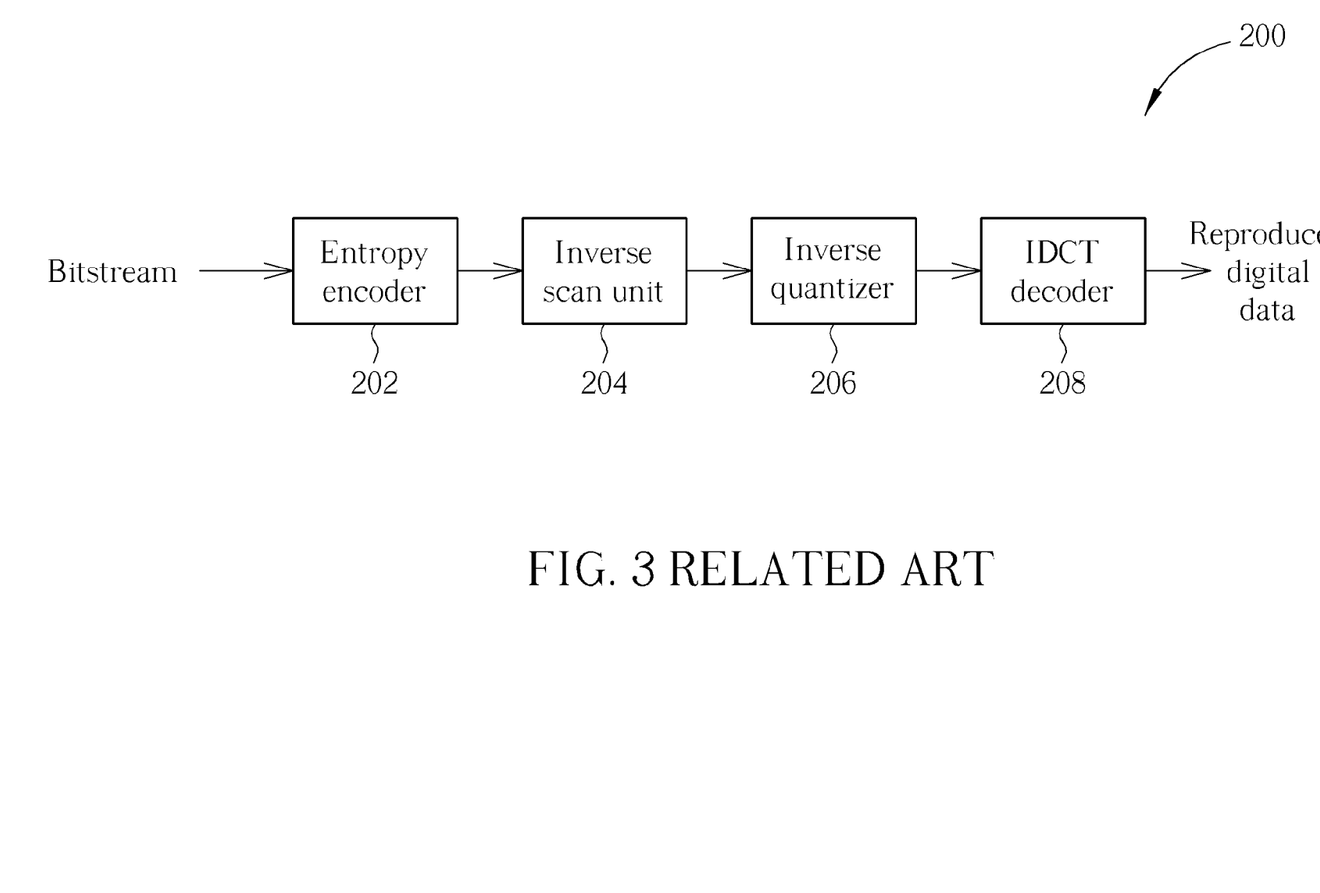
FIG. 3 is a simplified block diagram illustrating a decoder according to the related art.

FIG. 3 is a simplified block diagram illustrating a decoder according to the related art. The conventional decoder 200 includes an entropy decoder 202, an inverse scan unit 204, an inverse quantizer 206, and an IDCT decoder 208. The decoder 200 is to reverse the operations performed by the encoder 100. The entropy decoder 202 decodes the bitstream generated from the encoder 100 into (run, level) pairs for each data block, and then outputs a sequence consisting of zero values and non-zero values according to the (run, level) pairs. Next, the inverse scan unit 204 restores two-dimensional data blocks of quantized DCT coefficients according to the same zigzag scan order employed in the encoder 100. These two-dimensional data blocks are input to the inverse quantizer 206, and the an output of the inverse quantizer 206 is inverse transformed in the IDCT decoder 208 to generate reproduced digital data.

As mentioned above, the quantized coefficients at different positions in a data block are scanned according to the selected zigzag scan order. The result of the (run, level) pairs highly depends on the zigzag scan order used for scanning the quantized coefficients. Therefore, the coding performance is related to the employed scan order. The same zigzag scan order might not be efficient for coding all of the data blocks in the raw digital data. Using a fixed scan order would therefore result in poor coding performance.

SUMMARY

It is therefore one of the objectives of the present invention to provide scanning methods of transform-based digital data processing that adaptively adjust the scan order according to recorded characteristics information and related apparatus thereof. In one exemplary embodiment, a scanning method of transform-based digital data processing is provided. The scanning method includes: when processing data blocks, recording characteristics information for different block categories individually; conditionally adjusting scan orders of data processing of the block categories according to the characteristics information; and performing the data processing upon a current data block according to a scan order corresponding to a block category to which the current data block belongs.

In another exemplary embodiment, a processing order determining method of transform-based digital data processing is provided. The processing order determining method includes: recording characteristics information when processing data blocks; conditionally adjusting a processing order according to the characteristics information; keeping at least one position in the processing order fixed regardless of changes made to the processing order; and performing a data processing upon a current data block according to the processing order.

In yet another exemplary embodiment, a transform-based digital data processing apparatus is provided. The transform-based digital data processing apparatus supports a fixed scan order and a conditionally-adjusted scan order, and selectively utilizes the fixed scan order or the conditionally-adjusted scan order to process transform-based digital data. The transform-based digital data processing apparatus includes: a first storage module configured for storing a scan order, a second storage module configured for storing characteristics information, a first processing module configured for recording the characteristics information into the second storage module, a second processing module configured for adjusting the scan order, and a third processing module, configured for processing the transform-based digital data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

The present invention discloses a scanning method of transform-based digital data processing that determines a scan order according to statistics information of the processed data blocks. In addition, no scan order information is required to be transmitted to the decoder from the encoder as the decoder can easily derive the desired scan order according to the statistics information of the encoded data generated from the encoder. More specifically, the scanning method of the present invention, employed in either an encoder or a decoder, records characteristics information for different block categories individually when processing data blocks, and conditionally adjusts scan orders of data processing of the block categories according to the recorded characteristics information. Furthermore, the scanning method could be implemented in integer transform-based digital data processing applications or non-integer transform-based digital data processing applications. Further description is detailed as follows.

Figure 4:
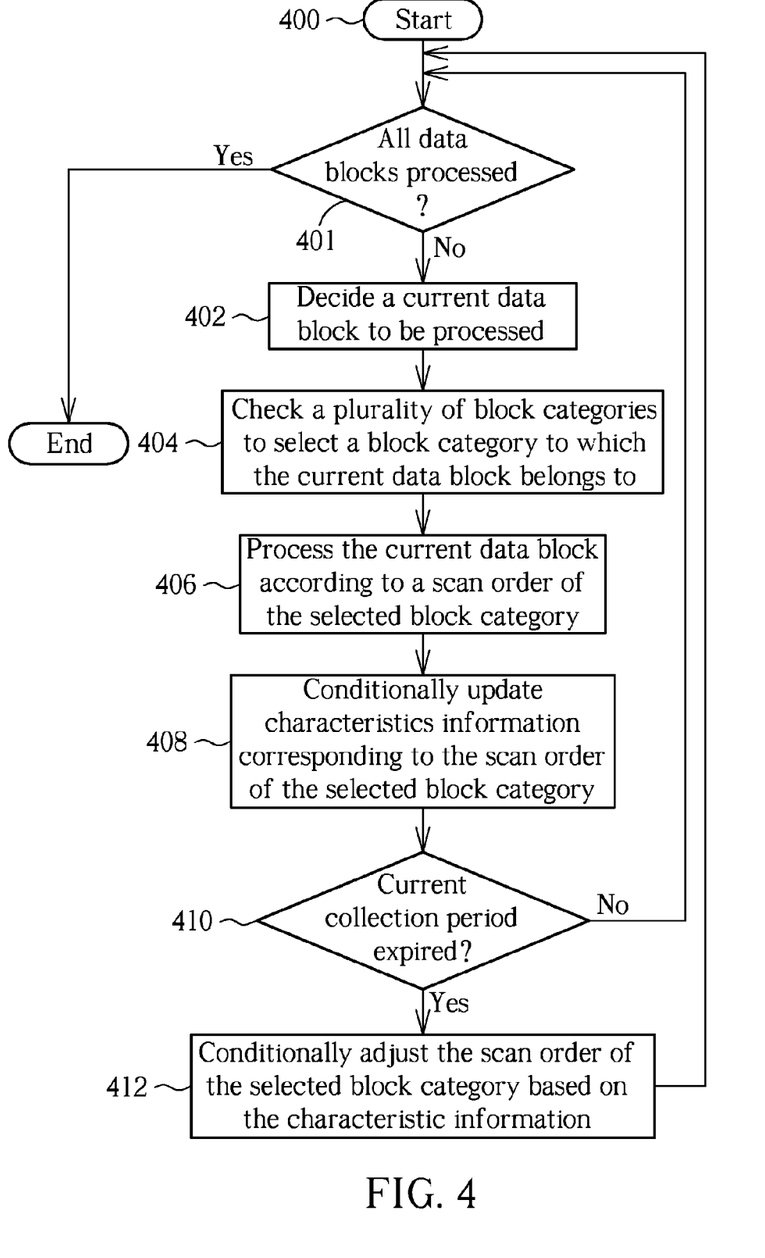
FIG. 4 is a flowchart of a method for determining a scan order for encoding/decoding data blocks according to an exemplary embodiment of the present invention.

FIG. 4 is a flowchart of a method for determining a scan order used for encoding/decoding data blocks according to an exemplary embodiment of the present invention. If the result is substantially the same, the steps are not limited to be executed in the exact order shown in FIG. 4. The method for determining a scan order includes following steps:

Step 400: Start.

Step 401: Have all of the data blocks processed? If yes, go to step 414; otherwise, go to step 402.

Step 402: Decide a current data block to be processed.

Step 404: Check a plurality of block categories to select a block category to which the current data block belongs to.

Step 406: Process the current data block according to a scan order of the selected block category.

Step 408: Conditionally update characteristics information corresponding to the scan order of the selected block category.

Step 410: Has a current collection period of the characteristics information expired? If yes, go to step 412; otherwise, go to step 401.

Step 412: Conditionally adjust the scan order of the selected block category based on the characteristics information. Go to step 401.

Step 414: End.

The flow begins at step 400. In the beginning, no data block has been processed. Therefore, step 401 allows the flow of determining/updating the scan order to proceed with the next step 402. Next, step 402 selects a current data block to be processed. For example, a block having 4×4 quantized coefficients is selected. After the data block to be processed is determined, step 404 checks a plurality of block categories to select a block category to which the current data block belongs. In an exemplary embodiment, the block categories could be classified by different color components (e.g., Y, Cb, and Cr, or luminance and chrominance), different block sizes (e.g., 16×16, 8×16, 16×8, 8×8, 4×8, 8×4, 4×4, etc.), different block processing modes (e.g., intra-coded mode, inter-coded mode, etc.), or different transform types (e.g., integer transform and Hadamard transform employed in a hierarchical transform scheme). In other words, a scan order dedicated to one block category is allowed to be different from a scan order dedicated to another block category. In this way, the coding performance could be optimized.

Step 406 then processes the current data block according to a scan order of the selected block category. In the beginning, an initial (nominal) scan order for the selected block category is loaded. For example, a conventional zigzag scan order shown in FIG. 2 or a predefined scan order could be used. Next, the current data block is scanned according to the initial (nominal) scan order, and the characteristics information at each position of the current data block being processed is recorded (Step 408).

After the current data block has been processed, the flow checks if a collection period of the characteristics information has expired (Step 410). For example, in an exemplary embodiment, the collection period is defined to accumulate characteristics information of N data blocks. If the current data block is not the $N^{th}$ data block, the flow continues processing the next data block. When step 410 finds that N data blocks have been processed during the collection period of the characteristics information, the flow proceeds with step 412 to conditionally adjust the scan order of the selected block category based on the characteristics information gathered during the collection period. If the scan order of the selected block category is adjusted, the adjusted scan order will be employed for processing following data blocks corresponding to the same block category during a next collection period of the characteristics information. Therefore, the flow proceeds with step 401 to start new data processing upon the next data block. Please note that the collection periods for different block categories could be different. For example, a macroblock (MB) of a 4:2:0 sampled signal contains four 8*8 blocks of Y component but only two 8*8 blocks of Cb component, the collection period for collecting 16 blocks of Y component is different from the collection period for collecting 16 blocks of Cb component.

Figure 5:
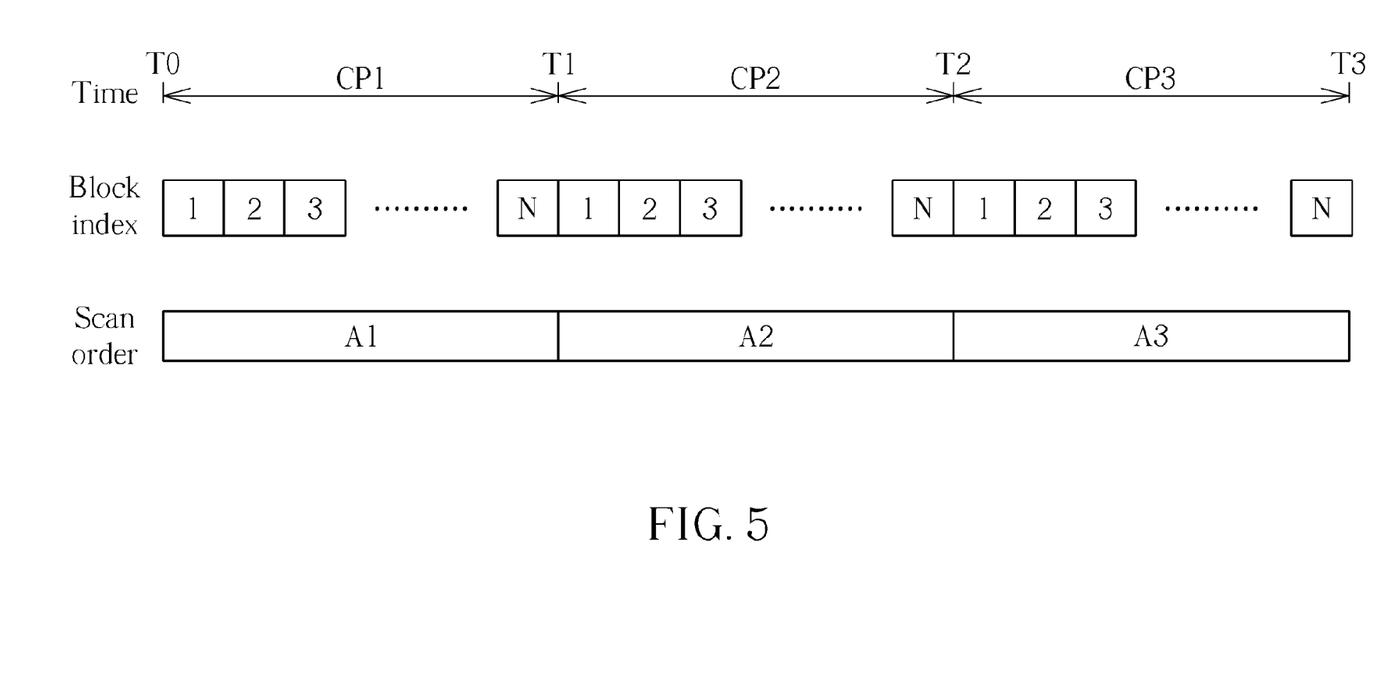
FIG. 5 shows an example of updating a scan order of a specific block category.
Figure 6:
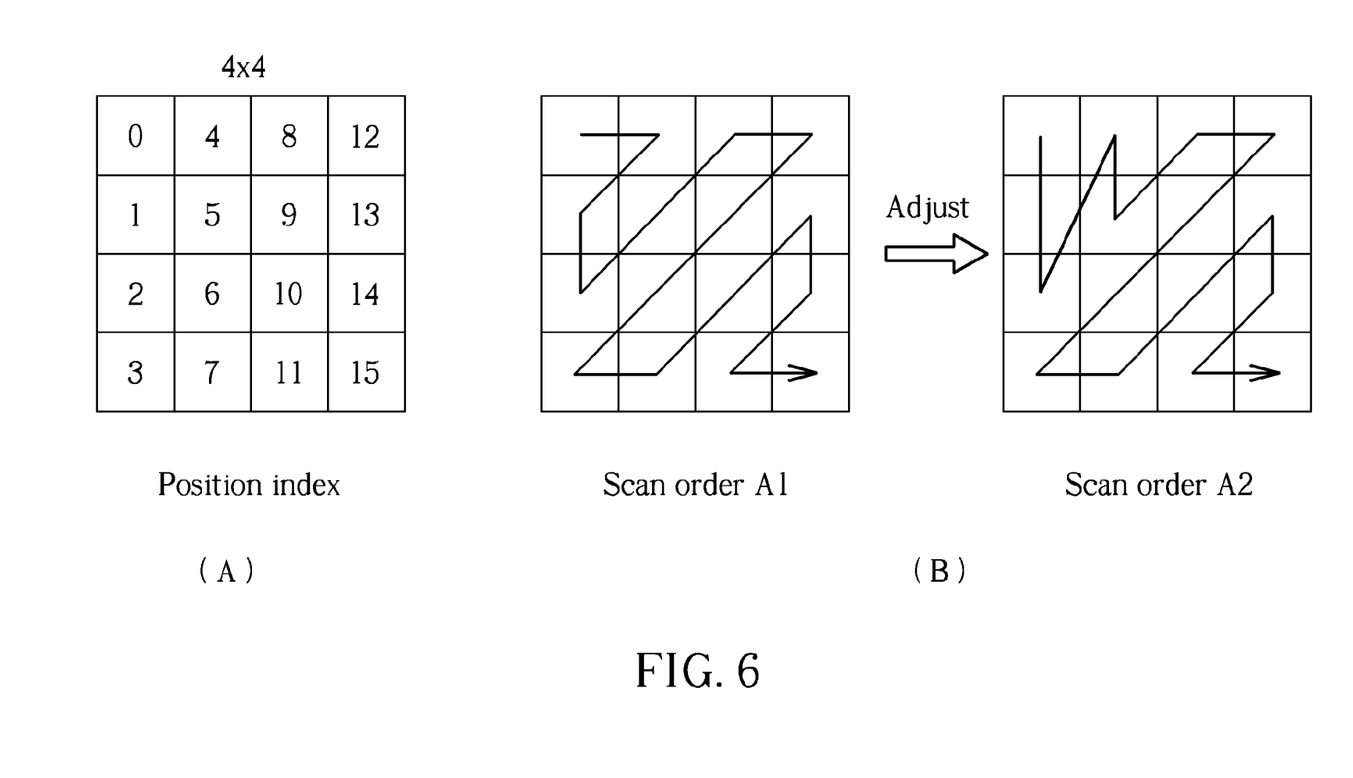
FIG. 6 is a diagram illustrating an exemplary 4×4 data block with a plurality of positions indexed by position indices 0-15, a scan order, and an adjusted scan order.

Please refer to FIG. 5, which shows an example of updating a scan order of a specific block category. As shown in FIG. 5, each of the collection periods of the characteristics information CP1, CP2 and CP3 is defined for accumulating characteristics information of N data blocks with block indices 1-N corresponding to the same block category. At time T0, an initial (nominal) scan order A1 is loaded and used to scan causal data at each position in a data block being processed. For example, a conventional zigzag scan order is used to scan quantized coefficients at each position of the data blocks $BK_1$-$BK_N$ being processed during the collection period CP1. When processing each of the data blocks $BK_1$-$BK_N$ during the collection period CP1, the characteristics information at each position is recorded or updated when necessary. Please refer to FIG. 6. FIG. 6 is a diagram illustrating an exemplary 4×4 data block with a plurality of positions indexed by position indices 0-15, a scan order, and an adjusted scan order. Suppose that each of the data blocks during the collection periods CP1, CP2, and CP3 has a block size of 4×4 as shown in FIG. 6. At time T0, the scan order A1 shown in sub-diagram (B) in FIG. 6 is used. Therefore, each of the data blocks $BK_1$-$BK_N$ to be processed during the collection period CP1 is scanned using the conventional zigzag scan order A1. In one implementation of the present invention, the recorded characteristics information includes the number of non-zero causal data (e.g., non-zero quantized DCT coefficient) in a data block being processed. The recorded characteristics information of this embodiment can be expressed by the following equation:

$$NZ_i = \sum_{b=1}^{P} NZ_{i,b} \quad (1)$$

In above equation (1), $NZ_{i,b}$ represents the characteristics information at a position with the position index i in the data block indexed by the block index b; and $NZ_i$ represents the accumulated characteristics information at a position with the position index i in a plurality of data blocks during the collection period (i.e., P data blocks corresponding to the same block category). In addition, if the causal data (e.g., the quantized DCT coefficient) at the position with the position index i in the data block indexed by the block index b is non-zero, the characteristics information $NZ_{i,b}$ is assigned by a predetermined value (e.g., 1); otherwise, the characteristics information $NZ_{i,b}$ is assigned by another predetermined value (e.g., 0). The scan order A1 will be followed to scan all positions in each of the data blocks $BK_1$-$BK_N$. When the collection period CP1 expires, the characteristics information $NZ_0$-$NZ_{15}$ at positions with the position indices 0-15 is therefore obtained. In other words, $NZ_0 = NZ_{0,1} + NZ_{0,2} + \ldots + NZ_{0,15}$, $NZ_1 = NZ_{1,1} + NZ_{1,2} + \ldots + NZ_{1,15}$, and so on.

As mentioned above, the characteristics information $NZ_i$ of a position with the position index i is derived by accumulating the number of non-zero causal data occurring at the same position with the position index i in a plurality of data blocks. When P is far greater than N, the accumulated characteristics information can be normalized. For example, when a maximum recorded number of non-zero causal data exceeds a predetermined threshold value, all of the recorded characteristics information (e.g., $NZ_0$-$NZ_{15}$) is normalized. One implementation of the normalization is to divide the accumulated values of the recorded characteristics information by a value equal to two. However, this is for illustrative purposes only, and is not meant to be taken as a limitation of the present invention.

In another implementation of the present invention, the recorded characteristics information includes a weighted number of non-zero causal data (e.g., non-zero quantized DCT coefficient) at each position of the data block being processed. In this alternative design, the recorded characteristics information can be expressed by the following equation:

$$NZ_i = \sum_{b=1}^{P} 2^{\lfloor b/M \rfloor} \cdot NZ_{i,b} \quad (2)$$

In above equation (2), the characteristics information $NZ_{i,b}$ at a position with the position index i in the data block indexed by the block index b is adjusted by a weighting factor $2^{\lfloor b/M \rfloor}$. For example, M is set by 4 (i.e., M=4) for four 8×8 data blocks of a macroblock (MB). In this way, there is no need to rearrange the weighted value representative of the recorded characteristics information $NZ_i$; in addition, it is easy to implement the weighting function by bit-shifting the characteristics information $NZ_{i,b}$ and then summing up the bit-shifted characteristics information to derive the weighted characteristics information $NZ_i$.

Referring to FIG. 5, at time T1 (i.e., the end of the collection period CP1), the scan order A1 is adjusted/rearranged according to values of the recorded characteristics information $NZ_0$-$NZ_{15}$. As shown in sub-diagram (B) in FIG. 6, the adjusted scan order A2 is derived and then used to scan causal data at each position in a data block being processed, i.e., quantized coefficients at each position of the data blocks $BK'_1$-$BK'_N$ being processed during the collection period CP2 immediately following the collection period CP1. Furthermore, the adjusted scan order A2 is derived from sorting the values of the characteristics information $NZ_0$-$NZ_{15}$ in ascending or descending order.

In addition, when sorting the values of the characteristics information $NZ_0$-$NZ_{15}$, one exemplary implementation of the scanning method of the present invention keeps at least one position in the scan order fixed regardless of changes made to the scan order. Taking the exemplary scanning orders shown in FIG. 2 as example, the order of the position indexed by 0 (i.e., the top-left position), which generally stores the DC coefficient, is kept unchanged in the scan order. However, it should be noted that this does not imply that the scanning method of the present invention is required to keep the start point of the scan order fixed at the position indexed by 0.

Furthermore, when sorting the values of the characteristics information $NZ_0$-$NZ_{15}$ in ascending or descending order, one exemplary implementation of the scanning method of the present invention keeps an order of two adjacent positions having the same number of non-zero causal data unchanged. With regard to another exemplary implementation of the scanning method of the present invention, the recorded characteristics information further includes the number of causal data with magnitude of one (i.e., +1 or −1) at each position of the data block being processed. Therefore, when sorting the values of the characteristics information $NZ_0$-$NZ_{15}$ in ascending or descending order, the scanning method sorts two adjacent positions having the same number of non-zero causal data according to numbers of causal data with magnitude of one at these two adjacent positions.

Similarly, the same procedure mentioned above is repeatedly executed to update the scan order according to the recorded characteristics information when processing the data blocks. As shown in FIG. 5, the characteristics information (e.g., the number of non-zero causal data at each position in a data block being processed or the weighted number of non-zero causal data at each position in a data block being processed) is recorded or updated during each of the following collection periods CP2 and CP3, and the scan order is conditionally adjusted at the adjustment timing T2 and T3 according to the recorded characteristics information, respectively.

Moreover, in order to reduce the complexity of sorting the recorded characteristics information at each adjustment timing (e.g., sorting $NZ_0$-$NZ_{15}$ at time T1), an alternative design of updating a candidate scan order during the collection period is proposed. That is, the method further updates the candidate scan order when processing each data block. A first exemplary embodiment checks the candidate scan order from a tail position to a head position to see if an order of two adjacent positions should be swapped. The operation can be represented by the following exemplary psudocode:

for (i=Scan_Length −1; i≥0; i−−)
if (NZ_Count[i]>NZ_Count[i−1]+u)
swap_scan (i, i−1)

Briefly summarized, the total number of positions arranged in the candidate scan order is equal to Scan_Length, and the positions defined in the candidate scan order are checked from a tail position (i.e., NZ_Count[Scan_Length−1]) to a head position (i.e., NZ_Count[0]). Please note that the parameter u included in the above psudocode can avoid unnecessary swapping of an order of two adjacent positions, if the parameter u is set by a positive value greater than zero. Specifically, the function of the non-zero parameter u is equivalent to filtering out or suppressing undesired noise interference. For example, certain localized scan order characteristic sometimes may result in NZ_Count[i]>NZ_Count[i−1]. If the order swapping is performed frequently due to the localized scan order characteristic, the overall coding performance might be degraded. Therefore, an order of two adjacent positions is swapped only when the difference between the corresponding recorded characteristics information thereof is significant enough to satisfy the inequality NZ_Count[i]>NZ_Count[i−1]+u. However, the aforementioned parameter u is optional, and can be omitted depending upon design requirements. For example, in a case where the localized scan order characteristic is negligible, the parameter u is set by a value equal to zero. As a result, an order of two adjacent positions is swapped when the difference between the corresponding recorded characteristics information thereof satisfies the inequality NZ_Count[i]>NZ_Count[i−1]. It should be noted that an order of two adjacent positions having the same number of non-zero causal data remains unchanged, no matter whether the parameter u is set by a value equal to zero. In the following, the features of the present invention are illustrated using an exemplary implementation with the parameter u omitted therein.

Figure 7:
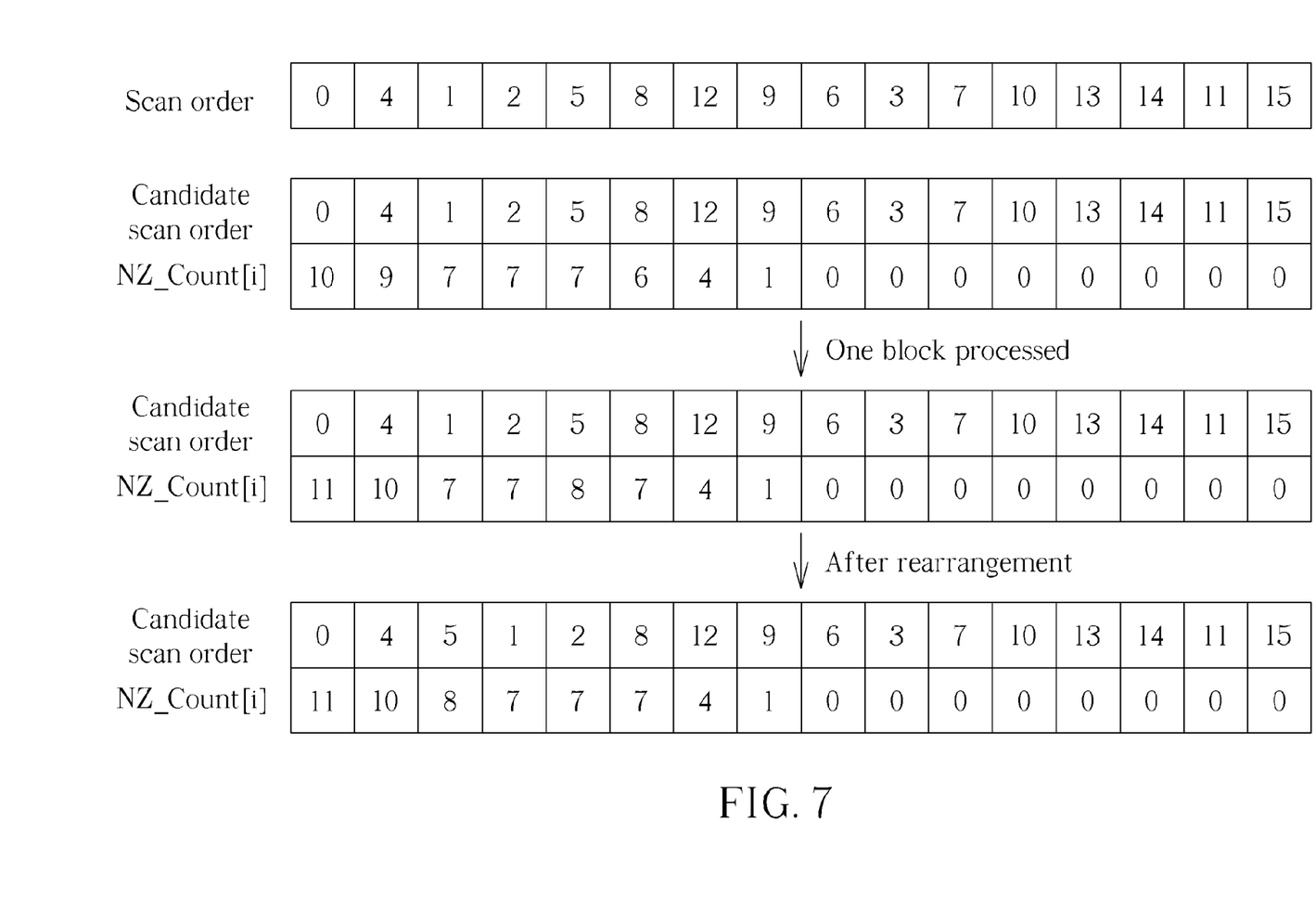
FIG. 7 is a diagram illustrating the operation of updating a candidate scan order after processing a block by checking the candidate scan order from a tail position to a head position.

An order of two adjacent positions are not swapped if the recorded characteristics information thereof is identical to each other, or if the recorded characteristic information at the later position (i.e., NZ_Count[i]) is less than that of the former position (i.e., NZ_Count[i−1]); however, an order of two adjacent positions is swapped if the recorded characteristics information at the later position (i.e., NZ_Count[i]) is greater than the recorded characteristics information at the former position (i.e., NZ_Count[i−1]). Please refer to FIG. 7, which shows a diagram illustrating the operation of updating a candidate scan order after processing a block by checking the candidate scan order from a tail position to a head position. As shown in FIG. 7, the scan order determined at the adjustment timing (e.g., T1 shown in FIG. 5) for a 4×4 data block has the following order of position indices: 0, 4, 1, 2, 5, 8, 12, 9, 6, 3, 7, 10, 13, 14, 11, 15. Therefore, the initial setting of the candidate scan order to be updated during a collection period following the adjustment timing (e.g., the collection period CP2 shown in FIG. 5) is set by the scan order determined at the adjustment timing, and the positions arranged in the initial candidate scan order therefore have corresponding recorded characteristics information NZ_Count [i] in a descending order: 10, 9, 7, 7, 7, 6, 4, 1, 0, 0, 0, 0, 0, 0, 0, 0. After one data block has been processed, the characteristics information might be updated. In this example shown in FIG. 7, the values of recorded characteristics information corresponding to the position indices 0, 4, 5, and 8 are incremented by one. Therefore, when the candidate scan order is checked from the tail position to the head position, an order of the positions indexed by the position indices 2 and 5 are swapped, and then an order of positions indexed by the position indices 1 and 5 are swapped, resulting in the rearranged candidate scan order having the following order of position indices: 0, 4, 5, 1, 2, 8, 12, 9, 6, 3, 7, 10, 13, 14, 11, 15.

At the end of the collection period, the candidate scan order is rearranged to derive the adjusted scan order actually used in scanning data blocks during the following collection period of characteristics information. Please note that updating of the candidate scan order during the collection period does not affect the actual scan order used for scanning the data blocks processed during the same collection period. In other words, the actual scan order is adjusted only when one collection period does expire (e.g. at T1, T2, or T3 shown in FIG. 5). As the candidate scan order has been preliminarily rearranged at the end of the collection period, the actual scan order can be quickly obtained by sorting the preliminarily updated candidate scan order according to the recorded characteristics information. In this way, the sorting complexity can be greatly reduced.

The example illustrated above is merely one of the possible implementations for realizing the candidate scan order updating during the collection period. A second exemplary embodiment of updating the candidate scan order, however, checks the candidate scan order from the head position to the tail position to see if an order of two adjacent positions should be swapped. The operation can be represented by the following exemplary psudocode:

for (I=0; I<Scan_Length; i++)
if (NZ_Count[i]<NZ_Count[i+]+u)
swap_scan (i, i+1)

Briefly summarized, the total number of positions arranged in the candidate scan order is equal to Scan_Length, and the positions defined in the candidate scan order are checked from a head position (i.e., NZ_Count[0]) to a tail position (i.e., NZ_Count[Scan_Length−1]). Similarly, the optional parameter u can be used to avoid unnecessary swapping of an order of two adjacent positions, if the parameter u is set by a positive value greater than zero. Therefore, an order of two adjacent positions is swapped only when the difference between the corresponding recorded characteristics information thereof is significant enough to satisfy the inequality NZ_Count[i]<NZ_Count[i+1]+u. As a person skilled in the art can readily understand features of the optional parameter u after reading above paragraphs, further description is omitted here for brevity. In the following, the features of the present invention are illustrated using an exemplary implementation with the parameter u omitted therein.

Figure 8:
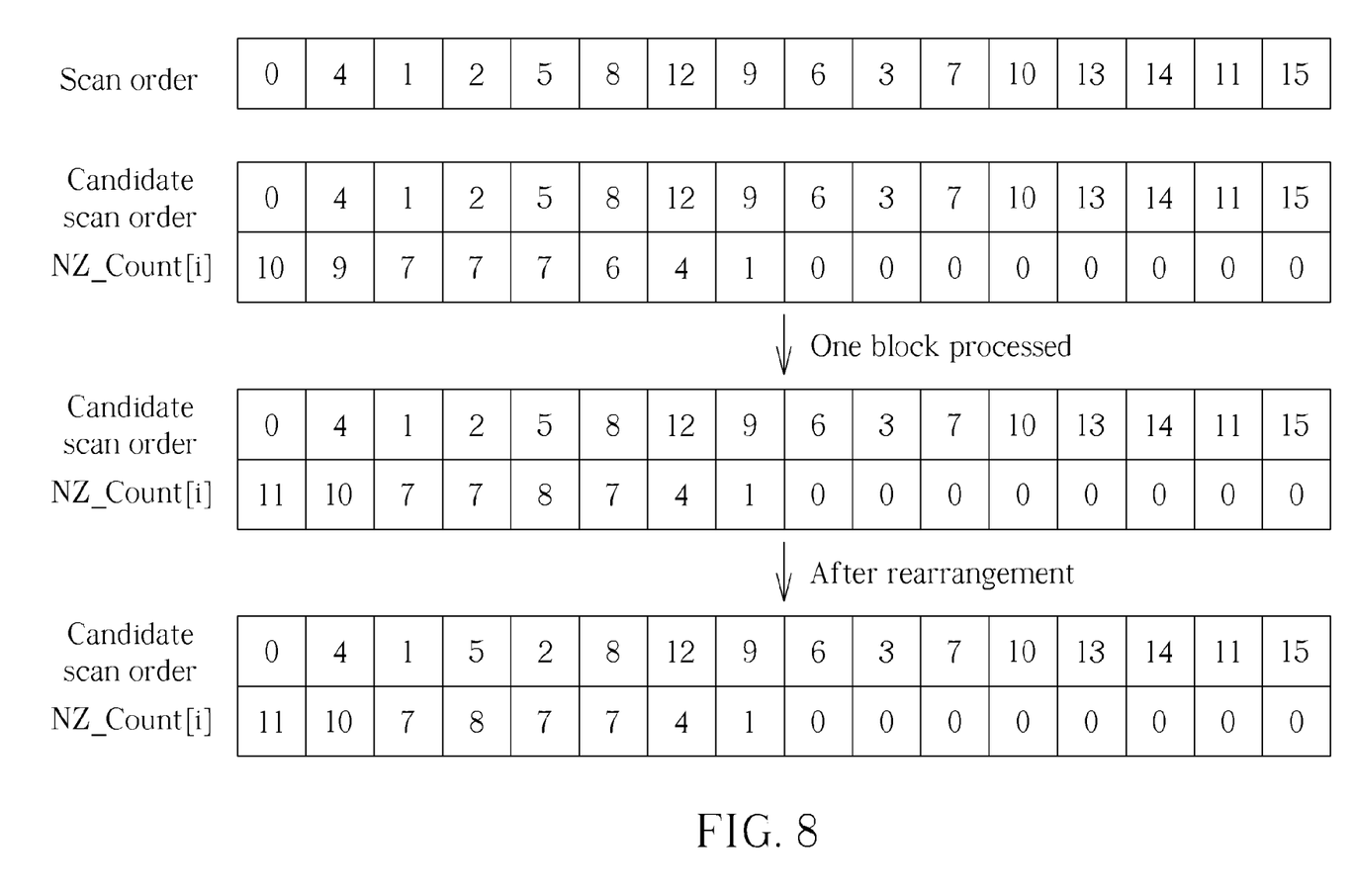
FIG. 8 is a diagram illustrating the operation of updating a candidate scan order after processing a block by checking the candidate scan order from a head position to a tail position.

An order of two adjacent positions are not swapped if the recorded characteristics information thereof is identical to each other or if the recorded characteristics information at the former position (i.e., NZ_Count[i]) is greater than that of the later position (i.e., NZ_Count[i+1]); however, an order of two adjacent positions are swapped if the recorded characteristics information at the former position (i.e., NZ_Count[i]) is less than the recorded characteristics information at the later position (i.e., NZ_Count[i+1]). Please refer to FIG. 8, which shows a diagram illustrating the operation of updating a candidate scan order after processing a block by checking the candidate scan order from a head position to a tail position. As shown in FIG. 8, the scan order determined at the adjustment timing (e.g., T1 shown in FIG. 5) for a 4×4 data block has the following order of position indices: 0, 4, 1, 2, 5, 8, 12, 9, 6, 3, 7, 10, 13, 14, 11, 15. Therefore, the initial setting of the candidate scan order to be updated during a collection period following the adjustment timing (e.g., the collection period CP2 shown in FIG. 5) is set by the scan order determined at the adjustment timing, and the positions in the initial candidate scan order therefore have corresponding recorded characteristics information NZ_Count [i] in a descending order: 10, 9, 7, 7, 7, 6, 4, 1, 0, 0, 0, 0, 0, 0, 0, 0. After one data block has been processed, the values of recorded characteristics information corresponding to the position indices 0, 4, 5, and 8 are incremented by one in this example shown in FIG. 8. Therefore, when the candidate scan order is checked from the head position to the tail position, only an order of positions indexed by the position indices 2 and 5 is swapped, resulting in the rearranged candidate scan order having the following order of position indices: 0, 4, 1, 5, 2, 8, 12, 9, 6, 3, 7, 10, 13, 14, 11, 15. Similarly, at the end of the collection period, the preliminarily updated candidate scan order is rearranged to derive the adjusted scan order used in the following collection period of characteristics information. Though the candidate scan order updated using a backward checking scheme might be different from the candidate scan order updated using a forward checking scheme, the adjusted scan orders derived from rearranging these two candidate scan orders may be identical to each other.

Figure 9:
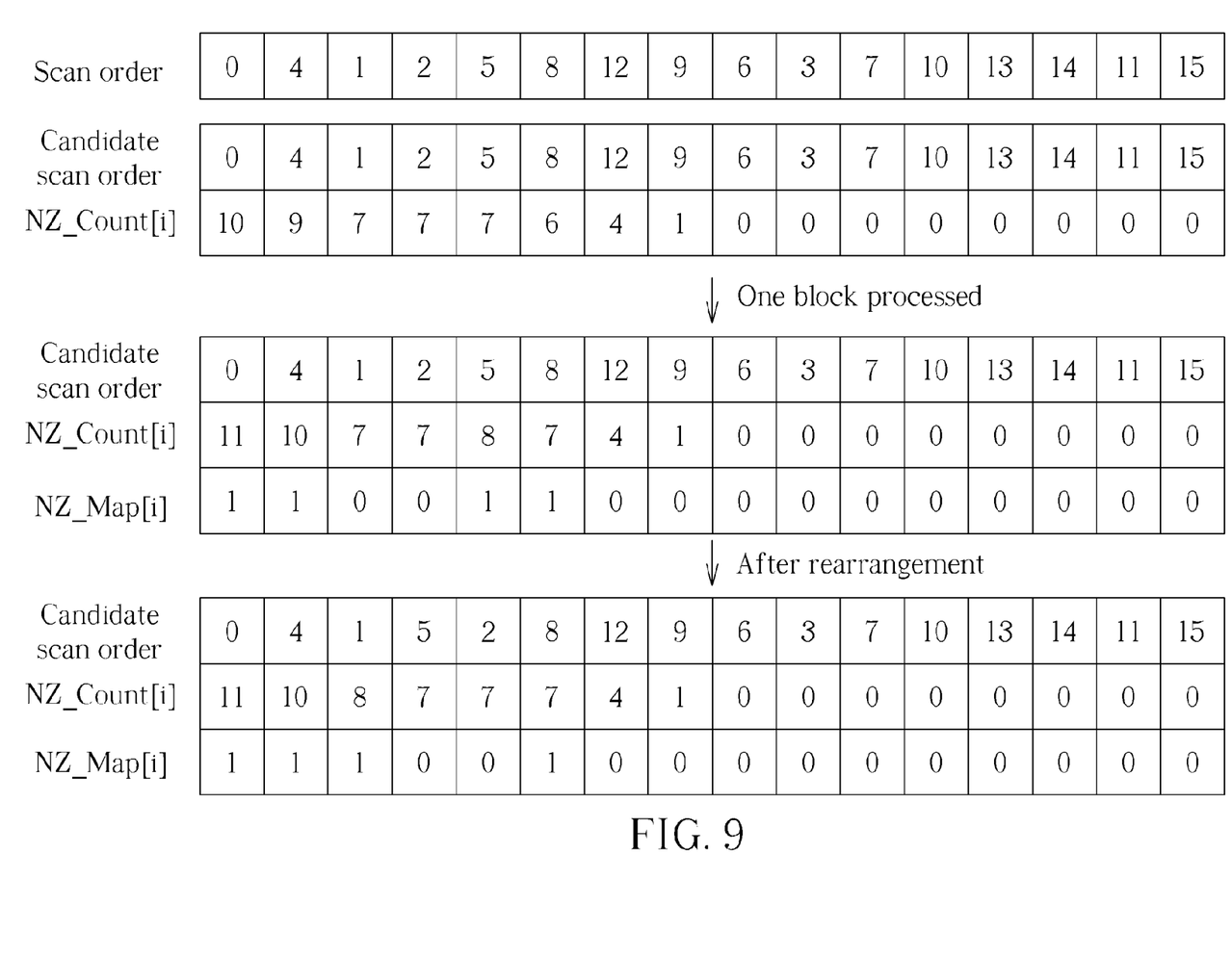
FIG. 9 is a diagram illustrating the operation of a modified method of updating a candidate scan order after processing a block by checking the candidate scan order from a tail position to a head position.

Regarding the method of updating the candidate scan order by using either a forward checking scheme or a backward checking scheme, the recorded characteristics information (e.g., the number of non-zero causal data or the weighted number of non-zero causal data) at every two adjacent positions must be compared to determine if the order of the two positions in the candidate scan order should be swapped. To improve the updating efficiency of the candidate scan order, auxiliary information could be recorded and referenced. In a modified method of updating the candidate scan order by using either a forward checking scheme or a backward checking scheme, a flag value corresponding to each position of the data block being processed is recorded to indicate whether or not the recorded characteristics information (e.g., the number of non-zero causal data or the weighted number of non-zero causal data) at the position to which the flag value corresponds is changed. The flag of each position I of the data block, symbolized as NZ_Map[i] in FIG. 9, is used to indicate if there is a non-zero data in current block or not. For example, if the number of non-zero causal data corresponding to a specific position in a data block is incremented by one when the data block is processed during a collection period, the flag value at the specific position is changed from an initial value (e.g., zero) to an adjusted value (e.g., one); otherwise, the flag value is kept intact. Updating the candidate scan order according to the characteristics information therefore includes checking the flag value corresponding to each position in the candidate scan order, and conditionally swapping the order of two adjacent positions only when the two adjacent positions of the candidate scan order have different flag values.

The operation of the modified method that updates the candidate scan order after processing a block by checking the candidate scan order from the tail position to the head position can be represented by following exemplary psudocode:

for(i=Scan_Length −1; i≥0; i−−)
    if ((NZ_Map[i]==1) && (NZ_Map[i−1]==0))
    if (NZ_Count[i]>NZ_Count[i−1]+u)
    swap_scan (i, i−1)

Therefore, the recorded characteristics information is actually examined only when a flag value at a former position of two adjacent positions in the candidate scan order stores "0" and a flag value at a latter position of two adjacent positions in the candidate scan order stores "1". As mentioned above, the optional parameter u can avoid unnecessary swapping of an order of two adjacent positions, if the parameter u is set by a positive value greater than zero. As features of the optional parameter u have been detailed in above paragraphs, further description is omitted here for brevity. In the following, the features of the present invention are illustrated using an exemplary implementation with the parameter u omitted therein.

FIG. 9 is a diagram illustrating the operation of a modified method of updating a candidate scan order after processing a block by checking the candidate scan order from a tail position to a head position. After one data block has been processed, the characteristics information might be updated as mentioned above. In this example shown in FIG. 9, the values of recorded characteristics information corresponding to the position indices 0, 4, 5, and 8 are incremented by one. Therefore, the corresponding flag values store a non-zero value (e.g., "1"). When the candidate scan order is checked from the tail position to the head position, the recorded characteristics information at positions indexed by the position indices 15, 11, 14, 13, 10, 7, 3, 6, 9, 12, and 8 would not be checked as the former flag value and the latter flag value in two adjacent flag values does not respectively store "0" and "1" ((NZ_Map[i−1]==0) && (NZ_Map[i]==1)), while the recorded characteristics information at positions indexed by the position indices 2 and 5 would be checked as the flag value corresponding to the position index 2 stores "0" and the flag value corresponding to the position index 5 stores "1". Next, the order of positions indexed by the position indices 2 and 5 in the candidate scan order is swapped as the recorded characteristics information at later position is larger than that of the former position. After the order of positions indexed by the position indices 2 and 5 is swapped, the recorded characteristics information at positions indexed by the position indices 1 and 5 are checked as the flag value corresponding to the position index 1 stores "0" and the flag value corresponding to the position index 5 stores "1". Therefore, the order of positions indexed by the position indices 1 and 5 in the amended candidate scan order is swapped. The recorded characteristics information at positions indexed by the position indices 4 and 0, however, would not be checked as the flag values both store "1". As a result, the rearranged candidate scan order has the following order of position indices: 0, 4, 5, 1, 2, 8, 12, 9, 6, 3, 7, 10, 13, 14, 11, 15.

The operation of the modified method that updates the candidate scan order by checking the candidate scan order from the head position to the tail position can be represented by following exemplary psudocode:

for (i=0; i<Scan_Length; i++)
    if ((NZ_Map[i]==0) && (NZ_Map[i+1]==1))
    if (NZ_Count[i]<NZ_Count[i+1]+u)
    swap_scan (i, i+1)

Therefore, the recorded characteristics information is actually examined only when a flag value at a former position of two adjacent positions in the candidate scan order stores "0" and a flag value at a latter position of two adjacent positions in the candidate scan order stores "1". As mentioned above, the optional parameter u can avoid unnecessary swapping of an order of two adjacent positions, if the parameter u is set by a positive value greater than zero. As features of the optional parameter u have been detailed in above paragraphs, further description is omitted here for brevity. In the following, the features of the present invention are illustrated using an exemplary implementation with the parameter u omitted therein.

Figure 10:
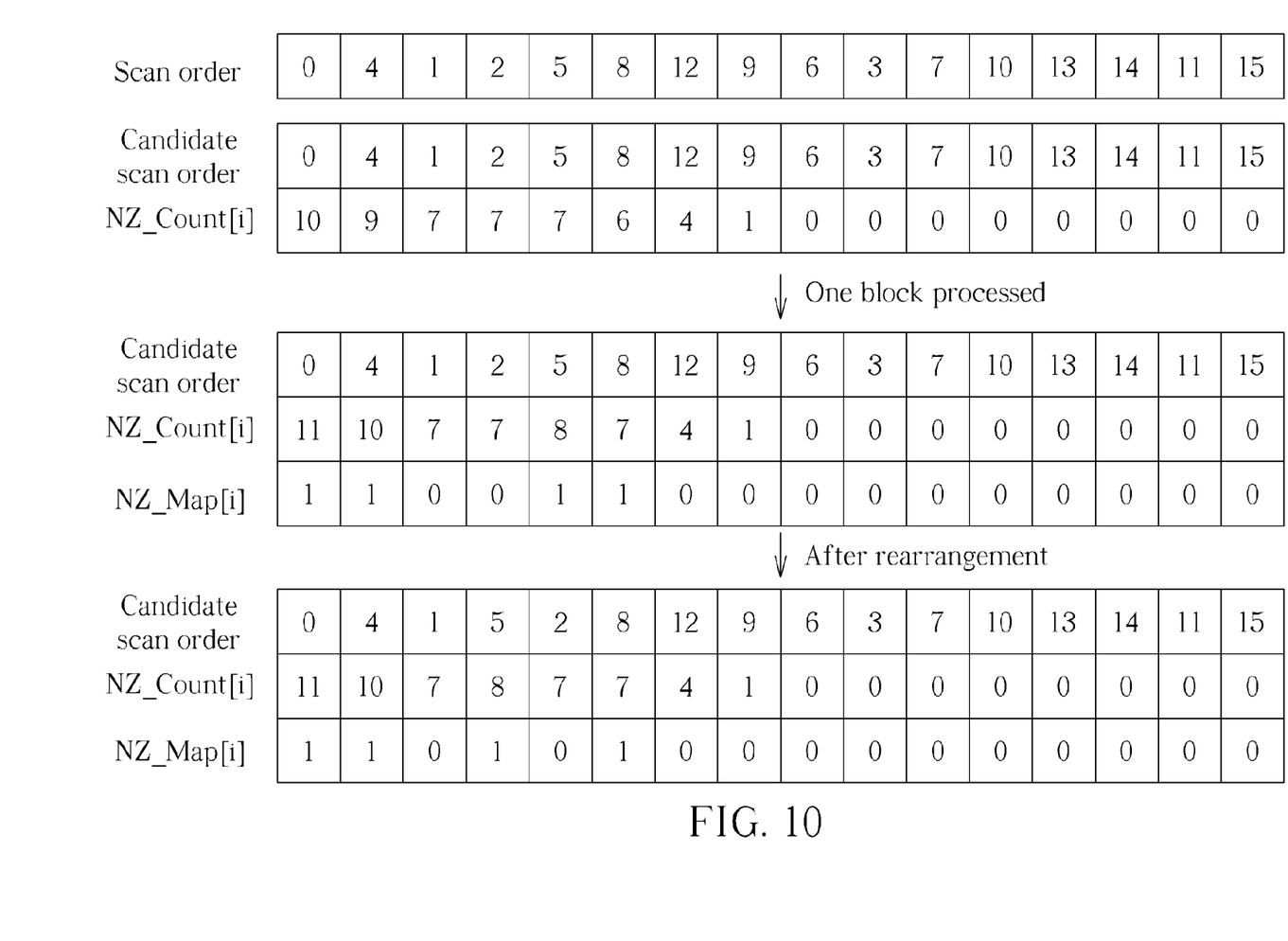
FIG. 10 is a diagram illustrating the operation of a modified method of updating a candidate scan order after processing a block by checking the candidate scan order from a head position to a tail position.

FIG. 10 is a diagram illustrating the operation of a modified method of updating a candidate scan order after processing a block by checking the candidate scan order from a head position to a tail position. After one data block has been processed, the characteristics information might be updated as mentioned above. In this example shown in FIG. 10, the values of recorded characteristics information corresponding to the position indices 0, 4, 5, and 8 are incremented by one. Therefore, the corresponding flag values store a non-zero value (e.g., "1"). When the candidate scan order is checked from the head position to the tail position, the recorded characteristics information at positions indexed by the position indices 0, 4, and 1 would not be checked as the former flag value and the latter flag value in two adjacent flag values does not respectively store "0" and "1", while the recorded characteristics information at positions indexed by the position indices 2 and 5 would be checked as the flag value corresponding to the position index 2 stores "0" and the flag value indexed by the position index 5 stores "1". Next, the order of positions indexed by the position indices 2 and 5 in the candidate scan order is swapped after checking the recorded characteristics information. After the order of positions indexed by the position indices 2 and 5 in the candidate scan order is swapped, the recorded characteristics information at positions indexed by the position indices 2 and 8 are checked as the flag value corresponding to the position index 2 stores "0" and the flag value indexed by the position index 8 stores "1". However, the order of positions indexed by position indices 2 and 8 is not changed in this example due to the fact that values of the recorded characteristics information corresponding to position indices 2 and 8 are identical to each other. The recorded characteristics information indexed by the remaining position indices 12, 9, 6, 3, 7, 10, 13, 14, 11, and 15 would not be checked as the flag values all store "0". As a result, the rearranged candidate scan order has the following order of position indices: 0, 4, 1, 5, 2, 8, 12, 9, 6, 3, 7, 10, 13, 14, 11, 15.

Figure 11:
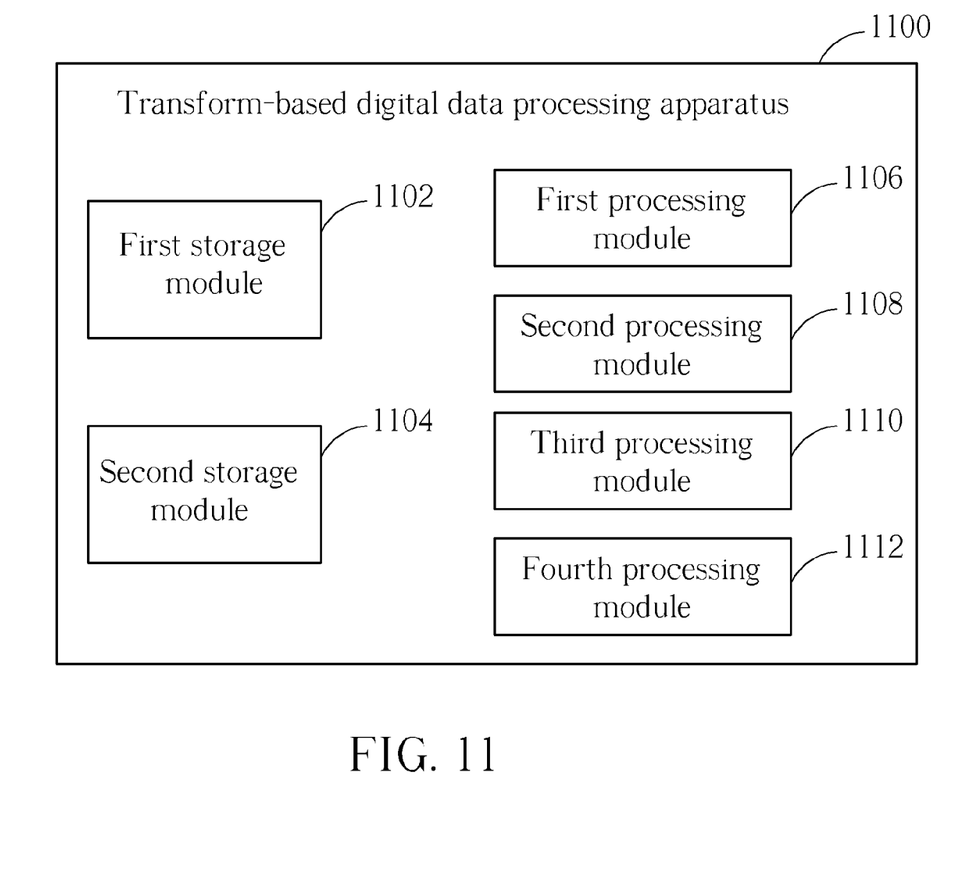
FIG. 11 is a block diagram illustrating an exemplary embodiment of a transform-based digital data processing apparatus according to the present invention.

Please refer to FIG. 11. FIG. 11 is a block diagram illustrating an exemplary embodiment of a transform-based digital data processing apparatus according to the present invention. The transform-based digital data processing apparatus 1100 supports a fixed scan order and a conditionally-adjusted scan order, and selectively utilizes the fixed scan order or the conditionally-adjusted scan order to process transform-based digital data. The exemplary transform-based digital data processing apparatus includes, but is not limited to, a first storage module 1102 configured for storing a scan order, a second storage module 1104 configured for storing characteristics information, a first processing module 1106 configured for recording the characteristics information into the second storage module 1104, a second processing module 1108 configured for adjusting the scan order, a third processing module 1110 configured for processing the transform-based digital data, and a fourth processing module 1112 configured for determining which one of the fixed scan order and the conditionally-adjusted scan order is employed to process the transform-based digital data. As the storage of the characteristic data of a block is well known in the pertinent art, one skilled in the art will readily know how to store the characteristic data of a block after reading the specification, further description is omitted here for brevity. Please note that the first, second, third, and fourth processing modules 1106, 1108, 1110, 1112 can be implemented using hardware, software, or a combination of both, depending upon design requirements.

In this exemplary embodiment, the fourth processing module 1112 refers to a video or image standard of the transform-based digital data to be processed for determining which one of the fixed scan order and the conditionally-adjusted scan order is employed to process the transform-based digital data. In addition, the second storage module 1104, the first processing module 1106, and the second processing module 1108 that are involved in deriving the conditionally-adjusted scan order are enabled only when the conditionally-adjusted scan order is selected to process the transform-based digital data. In other words, when the transform-based digital data processing apparatus 1100 processes the transform-based digital data using the conventional means (i.e., the fixed scan order is selected to process the transform-based digital data), the data handling associated with the conditionally-adjusted scan order is not required.

As using a fixed scan order (e.g., a conventional zigzag scan order) to process transform-based digital data is well known to a person skilled in the pertinent art, further description is omitted here for brevity. Similarly, as a person skilled in the pertinent art can readily understand the operation and function of the functional blocks associated with deriving the conditionally-adjusted scan order and processing the transform-based digital data using the conditionally-adjusted scan order after reading above paragraphs directed to the scanning method of transform-based digital data processing, further description is also omitted here for brevity.

Briefly summarized, a scanning method of transform-based digital data processing according to the present invention records characteristics information for different block categories individually when processing data blocks, conditionally adjusting scan orders of data processing of the block categories according to the characteristics information; and performing the data processing upon a current data block according to a scan order corresponding to a block category to which the current data block belongs. The scanning method can be employed in non-integer transform-based digital data processing applications or integer transform-based digital data processing applications. The block categories are classified by different color components (e.g., Y, Cb, and Cr, or luminance and chrominance), different block sizes (e.g., 16×16, 8×16, 16×8, 8×8, 4×8, 8×4, 4×4, etc.), different block processing modes (e.g., intra-coded mode and inter-coded mode), or different transform types (e.g., integer transform and Hadamard transfer). The scan order of one block category is not required to be identical to that of another block category. For example, DC coefficient data block (e.g., a 4×4 data block including luminance DC coefficients in intra macroblocks predicted in 16×16 mode or a 2×2 data block including chrominance DC coefficients) and AC coefficient data block in a hierarchical transform are entropy-encoded individually. As the DC coefficient data block and the AC coefficient data block have different non-zero data distributions, using individual scan orders for encoding the DC coefficient data block and the AC coefficient data block can result in an optimized entropy encoding performance.

The scanning method of the present invention conditionally adjusts scan orders of data processing of the block categories according to the characteristics information, where the characteristics information could be the number of non-zero causal data (e.g., non-zero quantized DCT coefficients) at each position in a data block of a block category (e.g., a 4×4 block or 8×8 block) or the weighted number of non-zero causal data (e.g., non-zero quantized DCT coefficients) at each position in a data block of a block category (e.g., a 4×4 block or 8×8 block). In addition, in a case where the characteristics information is derived from directly accumulating the non-zero causal data occurring at each position in a data block, normalization of the accumulated values is performed when a specific condition is met.

With regard to the updating of the scan order, a candidate scan order updating scheme can be implemented during the collection period of the characteristics information to thereby reduce the complexity of updating the scan order actually used for scanning data blocks. In addition, the candidate scan order can be updated using either a backward checking scheme or a forward checking scheme.

Furthermore, adjusting the scan order could be implemented by sorting the number of non-zero causal data or weighted number of non-zero causal data at each position of the data block corresponding to a specific block category in ascending or descending order. When two adjacent positions in the scan order have different numbers of non-zero causal data or weighted numbers of non-zero causal data, an order of the two adjacent positions in the scan order is swapped. However, when two adjacent positions have the same number of non-zero causal data or the same weighted number of non-zero causal data, one implementation is to keep the order of the two adjacent positions unchanged, while another implementation is to sort the two adjacent positions according to numbers of causal data with magnitude of one (e.g., +1 or −1) at the two adjacent positions. In a specific implementation, at least one position in the scan order is kept the same, regardless of the changes made to the scan order. Specifically, such an implementation can be generalized using a processing order determining method of transform-based digital data processing, which includes recording characteristics information (e.g., a number of non-zero causal data at each position in a data block being processed) when processing data blocks, conditionally adjusting a processing order (e.g., a scan order) according to the characteristics information, keeping at least one position in the processing order fixed regardless of changes made to the processing order, and performing a data processing upon a current data block according to the processing order.

As the scan order can be updated according to statistics information derived from the block data to be processed, there is no need to transmit the scan order used in the encoder to a decoder which uses the same initial (nominal) scan order adopted by the encoder. For example, the conventional zigzag scan order or any preset scan order could be used as the initial (nominal) scan order for the decoder. In other words, when a decoder employing the scanning method of transform-based digital data processing, the desired scan order can be obtained from the statistics information derived from the encoded bitstream generated from the encoder. As a result, as the decoder can obtain an adjusted scan order by updating an initial (nominal) scan order according to the statistics information gathered from the decoded quantized DCT coefficients, the initial setting of the scan order is not required to be transmitted via the encoded data generated from the encoder.

Those skilled in the art will readily observe that numerous modifications and alterations of the device and method may be made while retaining the teachings of the invention.

What is claimed is:

1. A scanning method of transform-based digital data processing, comprising:
when processing data blocks, recording characteristics information for different block categories individually;
while processing a current data block, conditionally adjusting scan orders of data processing of the block categories according to the characteristics information; and
performing the data processing upon the current data block according to a scan order corresponding to a block category to which the current data block belongs,
wherein conditionally adjusting scan orders of data processing of the block categories according to the characteristics information further comprises: during a specific collection period of the characteristics information, recording at least one flag value of a position of the data block to indicate whether or not the number of non-zero causal data at the position to which the flag value corresponds is changed, generating a new candidate scan order and updating the candidate scan order according to the characteristics information; and
wherein the characteristics information at least includes non-zero causal data information of a data block being processed corresponding to one block category.

2. The method of claim 1, wherein the block categories are classified by different color components, different block sizes, different block processing modes, or different transform types.

3. The method of claim 1, wherein the characteristics information includes a number of the non-zero causal data at each position in a data block being processed.

4. The method of claim 3, wherein conditionally adjusting scan orders of data processing of the block categories according to the characteristics information comprises:
adjusting a scan order of a corresponding block category based on the characteristics information when the specific collection period of the characteristics information expires.

5. The method of claim 4, wherein adjusting the scan order of the corresponding block category comprises:
adjusting the scan order by sorting the number of non-zero causal data at each position of the data block in an ascending or descending order.

6. The method of claim 5, wherein sorting the number of non-zero causal data at each position of the data block comprises:
when two adjacent positions in the scan order have different numbers of non-zero causal data, conditionally swapping an order of the two adjacent positions in the scan order.

7. The method of claim 6, wherein the recorded characteristics information further includes a number of causal data with magnitude of one at each position of the data block being processed; and sorting the number of non-zero causal data at each position of the data block further comprises:
when two adjacent positions have an identical number of non-zero causal data, sorting the two adjacent positions according to numbers of causal data with magnitude of one at the two adjacent positions.

8. The method of claim 4, wherein conditionally adjusting scan orders of data processing of the block categories according to the characteristics information further comprises:
during the specific collection period of the characteristics information, updating the candidate scan order according to the characteristics information by conditionally swapping an order of two adjacent positions of the candidate scan order that have different numbers of non-zero causal data; and
wherein when the specific collection period expires, the scan order is rearranged according to the candidate scan order and the characteristics information.

9. The method of claim 8, wherein conditionally adjusting scan orders of data processing of the block categories according to the characteristics information further comprises: during the specific collection period of the characteristics information, recording a flag value at each position of the data block being processed to indicate whether or not the number of non-zero causal data at the position to which the flag value corresponds is changed;
- wherein updating the candidate scan order according to the characteristics information comprises:
- checking the flag value at each position of the data block being processed; and
- conditionally swapping the order of the two adjacent positions only when the two adjacent positions of the candidate scan order have different flag values.

10. The method of claim 3, wherein the recorded characteristics information is normalized when a maximum number of non-zero causal data exceeds a predetermined threshold value.

11. The method of claim 1, wherein the characteristics information includes a weighted number of the non-zero causal data at each position of the data block being processed.

12. The method of claim 11, wherein conditionally adjusting scan orders of data processing of the block categories according to the characteristics information comprises:
- adjusting a scan order of a corresponding block category based on the characteristics information when the specific collection period of the characteristics information expires.

13. The method of claim 12, wherein adjusting the scan order of the corresponding block category comprises:
- adjusting the scan order by sorting the weighted number of non-zero causal data at each position of the data block in an ascending or descending order.

14. The method of claim 13, wherein sorting the weighted number of non-zero causal data at each position of the data block comprises:
- when two adjacent positions in the scan order have different weighted numbers of non-zero causal data, conditionally swapping an order of the two adjacent positions in the scan order.

15. The method of claim 14, wherein the recorded characteristics information further includes a number of causal data with magnitude of one at each position of the data block; and sorting the weighted number of non-zero causal data at each position of the data block further comprises:
- when two adjacent positions have an identical weighted number of non-zero causal data, sorting the two adjacent positions according to numbers of causal data with magnitude of one at the two adjacent positions.

16. The method of claim 12, wherein conditionally adjusting scan orders of data processing of the block categories according to the characteristics information further comprises:
- during the specific collection period of the characteristics information, generating a candidate scan order, and updating the candidate scan order according to the characteristics information by conditionally swapping an order of two adjacent positions of the candidate scan order that have different weighted numbers of non-zero causal data;
- wherein when the specific collection period expires, the scan order is re-arranged according to the candidate scan order and the characteristics information.

17. The method of claim 16, wherein conditionally adjusting scan orders of data processing of the block categories according to the characteristics information further comprises:
- during the specific collection period of the characteristics information, recording a flag value at each position of the data block to indicate whether or not the number of non-zero causal data at the position to which the flag value corresponds is changed;
- wherein updating the candidate scan order according to the characteristics information comprises:
- checking the flag value at each position of the data block; and
- conditionally swapping the order of the two adjacent positions only when the two adjacent positions of the candidate scan order have different flag values.

18. A transform-based digital data processing method supporting a fixed scan order and a conditionally-adjusted scan order and selectively utilizing the fixed scan order or the conditionally-adjusted scan order to process transform-based digital data, the transform-based digital data processing method comprising:
- storing a scan order;
- storing characteristics information;
- recording the characteristics information;
- adjusting the scan order according to the characteristics information gathered during a specific collection period while processing the transform-based digital data, wherein during the specific collection period of the characteristics information, recording at least one flag value of a position of a data block to indicate whether or not a number of non-zero causal data at the position to which a flag value corresponds is changed, generating a new candidate scan order and updating the candidate scan order according to the characteristics information.

19. The transform-based digital data processing method of claim 18, further comprising:
- determining which one of the fixed scan order and the conditionally-adjusted scan order is employed to process the transform-based digital data;
- wherein the scan order is adjusted only when the conditionally-adjusted scan order is selected to process the transform-based digital data.

20. The transform-based digital data processing method of claim 19, wherein a video or image standard of the transform-based digital data to be processed is referred to determine which one of the fixed scan order and the conditionally-adjusted scan order is employed to process the transform-based digital data.

* * * * *